Figure 1:
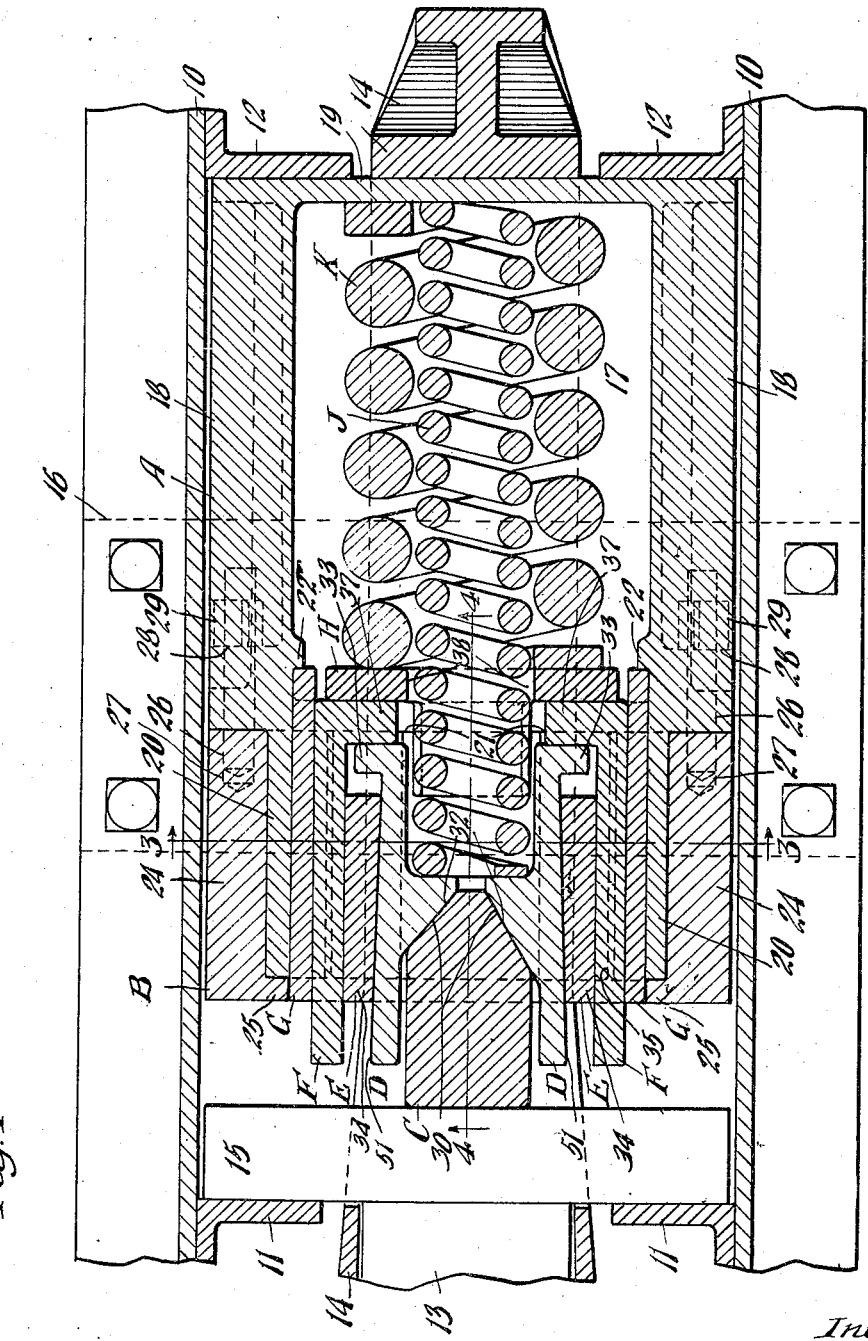

June 24, 1930. J. F. O'CONNOR 1,765,876
FRICTION SHOCK ABSORBING MECHANISM
Filed May 12, 1928 2 Sheets-Sheet 1

Witness
Wm. Geiger

Inventor
John F. O'Connor
By Joseph Harris
His Atty.

June 24, 1930. J. F. O'CONNOR 1,765,876
FRICTION SHOCK ABSORBING MECHANISM
Filed May 12, 1928 2 Sheets-Sheet 2
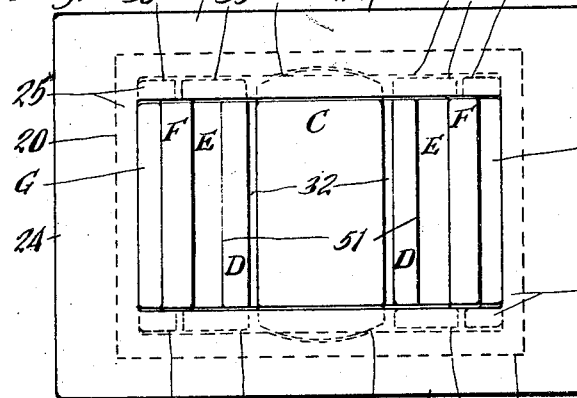
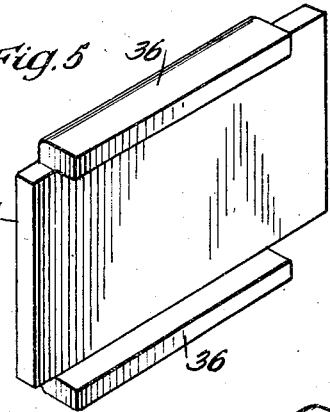
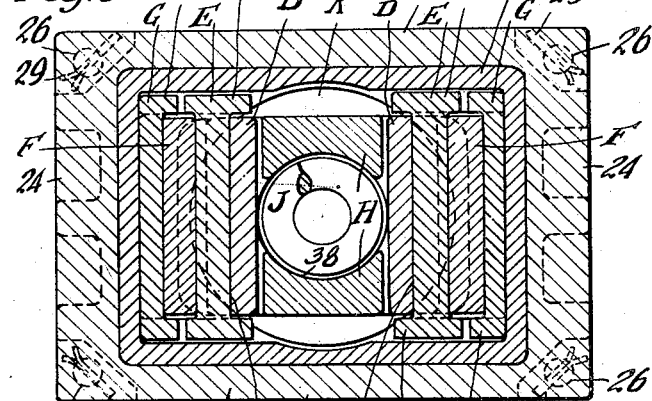
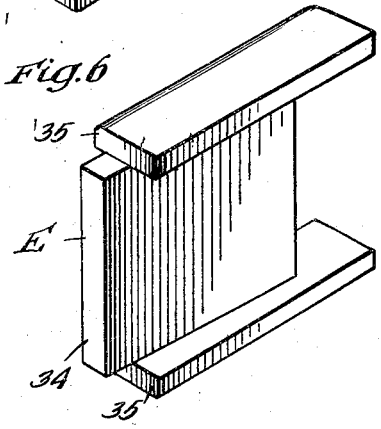
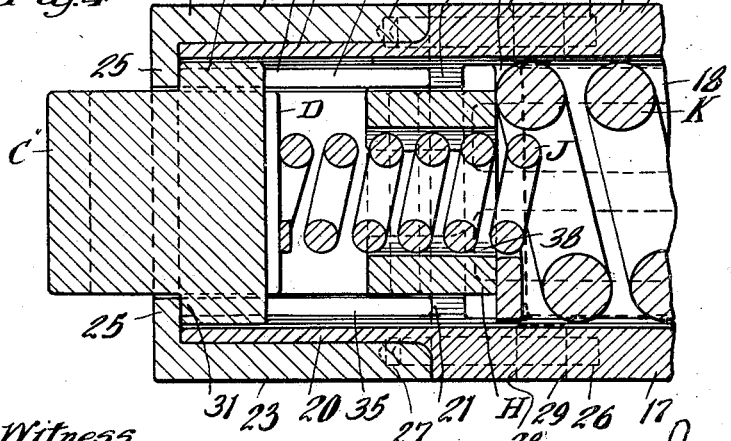
Inventor
John F. O'Connor
By Joseph Harris
His Atty.
Witness
Wm. Geiger Patented June 24, 1930

1,765,876

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Application filed May 12, 1928. Serial No. 277,265.

This invention relates to improvements in friction shock absorbing mechanisms.

One object of the invention is to provide a friction shock absorbing mechanism, including a friction shell and friction elements cooperating therewith, wherein the shell is reinforced against outward spreading by a band or housing of metal of exceptional strength, thereby preventing damage to the shell.

Another object of the invention is to provide a reinforcing band for the shell of a friction shock absorbing mechanism of the character indicated, wherein the reinforcing band also functions as a retaining means for holding the friction means which cooperates with the shell assembled with the latter.

A further object of the invention is to provide a friction shock absorbing mechanism, including a spring cage provided with a friction shell section having two opposed, interior friction surfaces and two inactive interior surfaces, movable friction elements cooperating with the shell, a pair of friction shoes, laterally displaceable friction members held against longitudinal movement, interposed between the shoes and the movable friction elements, and a wedge member cooperating with the friction shoes, wherein the movable friction elements and shoes are held out of contact with the inactive shell surfaces by flanges provided on the liners and longitudinally fixed friction members, and the wedge member is also held out of contact with the inactive surfaces of the shell by guide means on the shell to prevent scoring and wear of the inactive surfaces.

Other and further objects of the invention will more clearly appear from the description and claims hereinafter following.

In the drawings, forming a part of this specification, Figure 1 is a horizontal, longitudinal, sectional view of a portion of the underframe structure of a railway car, illustrating my improvements in connection therewith. Figure 2 is a front end elevational view of the friction shock absorbing mechanism proper of my improvements. Figure 3 is a transverse, vertical, sectional view, corresponding substantially to the line 3—3 of Figure 1. Figure 4 is a longitudinal, vertical, sectional view of the front end portion of the friction shock absorbing mechanism, corresponding substantially to the line 4—4 of Figure 1. And Figures 5 and 6 are detailed perspective views, respectively, of a liner and a friction member employed in connection with my improvements.

In said drawings, 10—10 indicate the usual center or draft sills of the railway car underframe, to the inner sides of which are secured front stop lugs 11—11 and rear stop lugs 12—12. The inner end portion of the coupler shank is designated by 13 and is operatively connected to a hooded yoke 14 of well known form. My improved shock absorbing mechanism proper and a front main follower 15 are disposed within the yoke and the yoke is in turn supported by a detachable saddle plate 16 secured to the bottom flange of the draft sills.

My improved friction shock absorbing mechanism includes, broadly, a casing A; a reinforcing band or housing B; a wedge block C; two friction shoes D; two relatively fixed friction member E—E; two movable friction elements F—F; a pair of liners G—G; a spring follower H; and a main spring resistance, including an inner coil J and an outer coil K.

The casing A is of substantially rectangular box-like form, having horizontally disposed, spaced top and bottom walls 17—17, longitudinally disposed, vertical, spaced side walls 18—18, and a transverse rear end wall 19. The end wall 19 cooperates with the stop lugs 12 in the manner of the usual rear follower. As clearly shown in Figure 1, the side walls 18 of the casing A are relatively thick and are cut away on the outer sides at the forward end of the casing. The top and bottom walls are also cut away at the outer ends. The cut-away portion of the casing provides the friction shell section proper of the casing and is designated by 20. The friction shell section 20 is also of substantially rectangular cross section and at the inner end thereof is provided with transversely disposed, interior, top and bottom abutment shoulders 21—21, for a purpose hereinafter pointed out. Rearwardly of the abutment shoulders 21, the side walls of the casing are provided with lateral projections 22—22, presenting front abutment shoulders which are adapted to engage the inner ends of the liners G.

The reinforcing band or housing B is in the form of a relatively heavy, rectangular, box-like casing, open at opposite ends and having longitudinally disposed, spaced top and bottom walls 23—23 and vertically disposed, longitudinally extending, spaced side walls 24—24. The band B is telescoped exteriorly with the friction shell section 20 of the casing and tightly fits the same, the inner end of the band abutting the transverse front end faces of the side, top and bottom walls of the casing proper. The outer surfaces of the side, top and bottom walls of the friction shell section 20 preferably taper slightly outwardly and the inner walls of the band C are tapered to correspond therewith, so that the band will have a driving fit with the shell section 20. At the forward end, the side walls of the band B are provided with inwardly extending, vertical flanges 25—25 which overhang the front ends of the side walls of the friction shell 20. The top and bottom walls of the band B are also provided with inwardly extending flanges which overhang the opening of the friction shell 20 and form front retaining stops.

Although the band B is retained by the driving fit which it has with the friction shell 20, additional means may be employed for securing the band in position. In the present instance, the additional retaining means comprises a plurality of pins 26—26 disposed at the corners of the band and fixed in openings 27—27. The casing is exteriorly cut away at the corners to provide lugs 28 which are perforated to receive the pins 26. The pins extend entirely through these lugs and are secured by retaining cotters 29—29 which extend therethrough.

The wedge member C is in the form of a solid block, having a transverse, vertical front end face which bears directly on the inner side of the front follower 15. At the inner end, the wedge is provided with a pair of wedge faces 30—30 on the opposite sides thereof. As most clearly shown in Figure 4, the inner end of the wedge is provided with top and bottom projections presenting transverse shoulders 31—31 which cooperate with the flanges 25 of the band B to limit outward movement of the wedge and also retain the same assembled with the casing.

The friction shoes D, which are of similar design, are disposed at opposite sides of the wedge block C. Each of the friction shoes D is provided with a longitudinally disposed outer friction surface 51 which cooperates with the adjacent friction member E. On the inner side, each friction shoe is provided with a lateral enlargement having a wedge face 32 on the front side thereof, cooperating with the wedge face 30 at the same side of the block C. At the inner end, each friction shoe is provided with a laterally outwardly projecting vertical flange 33 which cooperates with one of the friction elements to effect inward movement of the same with the shoe, as hereinafter pointed out.

The friction members E are disposed at opposite sides of the friction shoes. The two friction members E are of like design, each comprising a main plate-like section 34 provided with top and bottom flanges 35—35 projecting on opposite sides of the plate-like section.

As most clearly shown in Figure 6, the flanges are cut away at the forward end of the plate and project rearwardly beyond the inner end of the plate to an appreciable extent. As most clearly shown in Figure 1, the friction surfaces on the inner sides of the friction members E, which cooperate with the friction surfaces 51 of the shoes, are preferably converged inwardly of the mechanism. The outer friction surfaces of the friction members E are preferably disposed parallel to the longitudinal axis of the mechanism. The top and bottom flanges 35 of the friction members E are adapted to fit between the transverse flanges 25 of the band B and the shoulders 21 of the casing A, thereby holding the friction members against longitudinal movement with respect to the casing while permitting lateral displacement of the same.

The liners G are disposed at opposite sides of the friction shell 20 and bear directly on the inner surfaces of the side walls of the shell. As most clearly shown in Figure 5, each liner comprises a plate-like section provided with top and bottom flanges 36—36 which project laterally inwardly therefrom and are shorter than the plate section. The flange-like sections 36 of the liners G fit snugly between the flanges 25 of the band B and the shoulders 21 of the casing A, thereby holding the liners against longitudinal movement. As hereinbefore pointed out, the inner ends of the plate-like sections of the liners G also bear on the transverse abutment shoulders 22 of the casing.

The movable friction elements F are disposed at opposite sides of the mechanism and are interposed between the friction members E and the liners G. Each friction element F is in the form of a heavy rectangular plate-like member, presenting longitudinally disposed friction surfaces on the opposite sides thereof which cooperate with the friction surfaces of the liners and the friction members E. At the inner end, each friction element F is provided with a relatively heavy, laterally inwardly projecting flange 37, which engages in back of the flange 33 of the corresponding friction shoe D. The flanges 37, by engagement with the flanges 33, cause rearward movement of the friction elements F in unison with the friction shoes D.

Upon reference to Figure 4, it will be seen that the enlargements at the top and bottom sides of the wedge block C are spaced an appreciable distance from the top and bottom walls of the friction shell section 20, and that the wedge is guided between the flanges 25 of the band B so that the top and bottom projections will be maintained in spaced relation to the top and bottom walls of the friction shell throughout the movement of the wedge block.

As shown in Figure 3, the friction shoes are guided between the inwardly projecting top and bottom flanges 35 of the friction members E and the movable friction elements F are guided between the outwardly projecting sections of the flanges 35 of the friction members E and the inwardly projecting flanges 36 of the liners G, thereby preventing contact of the shoes and movable friction elements with the top and bottom walls of the friction shell.

It will thus be evident that the movable parts of the friction means are held out of contact at all times with the inactive top and bottom walls of the friction shell, thereby preventing damage to the top and bottom walls of the shell by scoring, and also protecting these walls against wear, thereby greatly prolonging the life of the friction shell.

The main spring resistance, comprising the coils J and K, is disposed within the casing A, the outer coil K being heavier than the inner coil J. As clearly shown in Figure 1, the inner coil J is of greater length than the outer coil and has the opposite ends thereof bearing directly on the inner ends of the enlargements of the friction shoes and the end wall 19 of the casing. The outer coil K of the spring resistance also has the rear end thereof bearing on the end wall 19 of the casing, the front end of the spring bearing on the spring follower H which is interposed between the spring and the inner ends of the movable friction elements F, the spring follower being perforated, as indicated at 38, to accommodate the inner coil of the spring resistance. The opening 38 is of such a size as to permit of movement of the spring follower H with respect to the coil J.

Inasmuch as the central coil of the spring resistance is independent of the outer coil, the same may act independently to restore the friction shoes and wedge block to normal position, thereby greatly facilitating the release of the mechanism.

In assembling the parts of my improved shock absorbing mechanism, the main spring resistance comprising the coils J and K, the spring follower, the liners, and the movable friction elements F, are first placed within the casing. The relatively fixed friction members E, the friction shoes and the wedge block are then inserted through the open front end of the casing, and the band B telescoped exteriorly of the friction shell section 20. As will be evident, when the band B has been forced into position, the top and bottom flanges 25 thereof serve to retain the liners, fixed friction members E, and the wedge block, in assembled position and limit the outward movement of these parts.

In the operation of my improved shock absorbing mechanism, assuming a buffing or inward force being applied to the follower 15, the wedge block C will be forced inwardly, carrying the friction shoes D—D therewith and forcing the same apart, placing the friction members E and friction elements F under lateral pressure. Inward movement of the friction shoes D forces the friction elements F to move inwardly in unison therewith through engagement of the flanges 33 of the friction shoes with the flanges 37 of the movable friction elements F. Inward movement of the movable friction elements is resisted by the heavy coil spring K while inward movement of the friction shoes is independently resisted by the lighter inner coil of the spring resistance J.

When a draft action is applied to the drawbar or coupler 13, the yoke will be pulled outwardly, thereby pulling the casing A forwardly and forcing the wedge block C inwardly with respect to the same, the operation of the mechanism being substantially the same as in buff.

In release, when the actuating force is reduced, the expansive action of the spring resistance elements J and K will force the friction shoes and friction elements F outwardly, restoring all of the parts to their normal position. As will be evident, if exceptional resistance is offered to the movement of the friction elements during the early part of the releasing action, the inner coil J of the spring resistance will act to force the friction shoes outwardly, thereby releasing the same and relieving the lateral pressure on the friction members E and friction elements F, whereupon the outer coil J of the spring resistance will become effective to restore the friction elements F to their normal position.

From the preceding description, taken in connection with the drawings, it will be evident that I have provided an exceedingly simple and efficient means for reinforcing the friction shell of a shock absorbing mechanism against outward spreading. The band B is made of metal of exceptional strength, so as to give the maximum reinforcing quality thereto, and may be constructed of alloy steel which is preferably heat treated. It is also pointed out that the reinforcing band, in addition to reinforcing the friction shell, also serves the important function of holding the parts of the friction system assembled and limiting outward movement of the wedge member.

While I have herein shown and described what I consider the preferred manner of carrying out my invention, the same is merely illustrative and I contemplate all changes and modifications which come within the scope of the claims appended hereto.

I claim:

1. A shell for friction shock absorbing mechanisms, including a tubular friction shell section at the forward end and a spring casing formed rearwardly thereof, and reinforcing means exteriorly embracing the friction shell section and having retaining means thereon overhanging the mouth of the shell.

2. A shell for friction shock absorbing mechanisms, including a spring cage casing having a friction shell section proper at one end thereof, said friction shell section being of smaller size exteriorly than the spring cage, and a heavy reinforcing band surrounding and tightly fitting the friction shell to reinforce the same against spreading, the reinforcing band corresponding in size exteriorly to the spring casing.

3. A shell for friction shock absorbing mechanisms, including a casing having relatively heavy side wall portions, said casing being open at one end and the side wall portions thereof being cut away exteriorly at said open end, said cut-away portions of the walls being integral with the remainder of the casing and forming a friction shell section proper, and a reinforcing sleeve embracing said cut-away portion and tightly fitting the same, said sleeve reinforcing the friction shell section against spreading.

4. A shell for friction shock absorbing mechanisms, including a casing of rectangular cross section, said casing being open at one end, the open end of said casing forming a friction shell section proper and the casing rearwardly of said friction shell section forming a spring cage, said friction shell section being integral with the spring cage, and a reinforcing band of rectangular cross section surrounding the friction shell section and tightly fitting and embracing the same to reinforce the shell against spreading.

5. In a friction shock absorbing mechanism, the combination with a friction shell open at one end and provided with interior friction surfaces at said open end; of friction means within the shell cooperating with said friction surfaces; spring means resisting inward movement of the friction means; and a band telescoped with the open end portion of the shell and surrounding the same, said band being provided with retaining flanges for holding the friction means assembled with the shell.

6. In a friction shock absorbing mechanism, the combination with a friction shell open at one end and having interior friction surfaces at said open end; of friction means within the shell having frictional engagement with the shell surfaces; spring resistance means opposing inward movement of the friction means; a wedge member having wedging engagement with the friction means; and a band telescoped exteriorly with the friction shell, said band having shouldered engagement with the wedge to limit outward movement thereof and hold the same assembled with the friction shell.

7. In a friction shock absorbing mechanism, the combination with a friction shell; of liners within the shell; friction means cooperating with the liners; spring resistance means opposing inward movement of the friction means; and a band telescoped exteriorly with the friction shell, said band having shouldered engagement with the liners to hold the same assembled with the shell.

8. In a friction shock absorbing mechanism, the combination with a rectangular casing, open at one end, said open end being provided with interior, opposed friction surfaces; of movable friction elements engaging said friction surfaces; friction members held against movement longitudinally of the mechanism while being laterally displaceable, cooperating with said movable friction elements; friction shoes having frictional engagement with said members; a pressure-transmitting member having wedging engagement with the shoes; and a band surrounding the friction shell and fitting the same, said band having shouldered engagement with the wedge and friction members to limit outward movement thereof and hold the same assembled with the friction shell, and said shell and friction members having shouldered engagement to hold said members against inward movement.

9. In a friction shock absorbing mechanism, the combination with a casing, open at one end thereof, the open end of said casing forming a friction shell section, said friction shell section being of rectangular cross section and having transverse, interior abutment shoulders at the inner end thereof; of a band of substantially rectangular cross section telescoped exteriorly with the friction shell, said band having transverse flanges overhanging the open end of the casing; liners at opposite sides of the casing presenting opposed, interior friction surfaces, said liners having top and bottom flanges engaged between the abutment shoulders of the shell and flanges of the band to hold said liners against longitudinal movement; movable friction elements cooperating with said liners; friction members engaging said movable elements, said members having top and bottom flanges engaged by said interior shoulders of the friction shell and the flanges of the band, to hold said members against longitudinal movement while permitting lateral displacement thereof; friction shoes having frictional engagement with the friction members; a block having wedging engagement with the shoes, said block being enlarged at the inner end, providing transverse shoulders engaging the flanges of the band to limit outward movement of the block and hold the same assembled with the shell; and spring resistance means within the casing yieldingly opposing inward movement of the friction shoes and movable friction elements.

10. In a friction shock absorbing mechanism, the combination with a casing, open at one end, said open end being of rectangular cross section and having spaced side walls and spaced top and bottom walls; of a band of rectangular cross section telescoped exteriorly with the rectangular end of the casing, said band having flanges overhanging the open end of the casing; a pressure-transmitting wedge block, said block being interposed between the flanges of the band and guided thereby to hold the same spaced from the top and bottom walls of the casing; friction shoes cooperating with the wedge member; movable friction elements; friction members engaged by the shoes and interposed between the same and the movable friction elements, said members being held against longitudinal movement with respect to the casing, said members having top and bottom flanges overhanging the friction shoes and movable friction elements to hold the shoes and movable elements out of contact with the top and bottom walls of the casing; and liners at opposite sides of the casing, having frictional engagement with the movable friction elements, the liners having top and bottom flanges between which the movable friction elements are guided.

In witness that I claim the foregoing I have hereunto subscribed my name this 10th day of May, 1928.

JOHN F. O'CONNOR.